(12) United States Patent
Kelly

(10) Patent No.: US 8,222,518 B2
(45) Date of Patent: Jul. 17, 2012

(54) PHOTOVOLTAIC ROOFING PANEL

(76) Inventor: Thomas L. Kelly, Waterbury, CT (US)

( * ) Notice: Subject to any disclaimer, the term of this patent is extended or adjusted under 35 U.S.C. 154(b) by 527 days.

(21) Appl. No.: 11/693,182

(22) Filed: Mar. 29, 2007

(65) Prior Publication Data

US 2008/0236653 A1 Oct. 2, 2008

(51) Int. Cl.
*H01L 31/0224* (2006.01)
*H01L 31/0203* (2006.01)

(52) U.S. Cl. ........ 136/256; 136/244; 136/251; 136/259; 438/51; 438/98

(58) Field of Classification Search .................. 136/243, 136/244, 251, 256; 52/173.3; 438/73
See application file for complete search history.

(56) References Cited

U.S. PATENT DOCUMENTS

| | | | |
|---|---|---|---|
| 4,127,424 A * | 11/1978 | Ullery, Jr. ...................... | 136/244 |
| 2004/0144043 A1* | 7/2004 | Stevenson et al. ............ | 52/173.3 |
| 2005/0178429 A1* | 8/2005 | McCaskill et al. ............ | 136/251 |
| 2007/0095388 A1* | 5/2007 | Mergola et al. ............... | 136/251 |
| 2007/0256727 A1* | 11/2007 | Gumm .......................... | 136/251 |
| 2008/0095985 A1* | 4/2008 | Frey et al. ..................... | 428/156 |
| 2008/0099062 A1* | 5/2008 | Armstrong et al. ........... | 136/248 |
| 2008/0245405 A1* | 10/2008 | Garvison et al. .............. | 136/251 |

* cited by examiner

*Primary Examiner* — Jennifer Michener
*Assistant Examiner* — Jayne Mershon
(74) *Attorney, Agent, or Firm* — Cantor Colburn LLP

(57) ABSTRACT

Disclosed is a photovoltaic roofing panel including at least one photovoltaic collector strip and a substrate configured to be disposed on a roof deck, the at least one photovoltaic collector strip being fixedly associated with the substrate.

19 Claims, 17 Drawing Sheets

PHOTOVOLTAIC ROOFING PANEL

FIELD OF THE INVENTION

The disclosure relates generally to photovoltaic panels, and more particularly to photovoltaic panels configured for disposal on a roof.

BACKGROUND

Photovoltaic strips employ solar power technology that uses solar photovoltaic arrays to convert energy from the sun into electricity. Photovoltaic arrays are a linked collection of photovoltaic modules. Each photovoltaic module is made of multiple interconnected solar cells that typically include silicone. The cells convert solar energy into direct current electricity, and work via photovoltaic effect. This effect converts sunlight into electricity.

An effective means of associating photovoltaics with roof structures (particularly existing roof structures) would be desirable in that it could provide an energy efficient way to generate electricity.

SUMMARY OF THE INVENTION

Disclosed is a photovoltaic roofing panel including at least one photovoltaic collector strip and a substrate configured to be disposed on a roof deck, the at least one photovoltaic collector strip being fixedly associated with the substrate.

Also disclosed is a photovoltaic roofing system including a roof deck at least one photovoltaic panel disposed with the roof deck, the at least one panel comprising at least one photovoltaic collector strip and a substrate configured to be disposed with the roof deck, the at least one photovoltaic collector strip being fixedly associated with the substrate.

Further disclosed is a photovoltaic panel arrangement including a plurality of photovoltaic panels, each of the plurality of panels including at least one photovoltaic collector strip and a substrate configured to be disposed on a roof deck, the at least one photovoltaic collector strip being fixedly associated with the substrate, and a means of associating the plurality of photovoltaic panels.

Still further disclosed is a method for providing photovoltaic power, the method including fixedly associating at least one photovoltaic strip with a substrate configured to be disposed on a roof of a structure, disposing the substrate on the roof, and electrically associating the at least one photovoltaic strip with the structure.

BRIEF DESCRIPTION OF THE FIGURES

Referring to the drawings wherein like elements are numbered alike in the several Figures.

DETAILED DESCRIPTION

Figure 1:
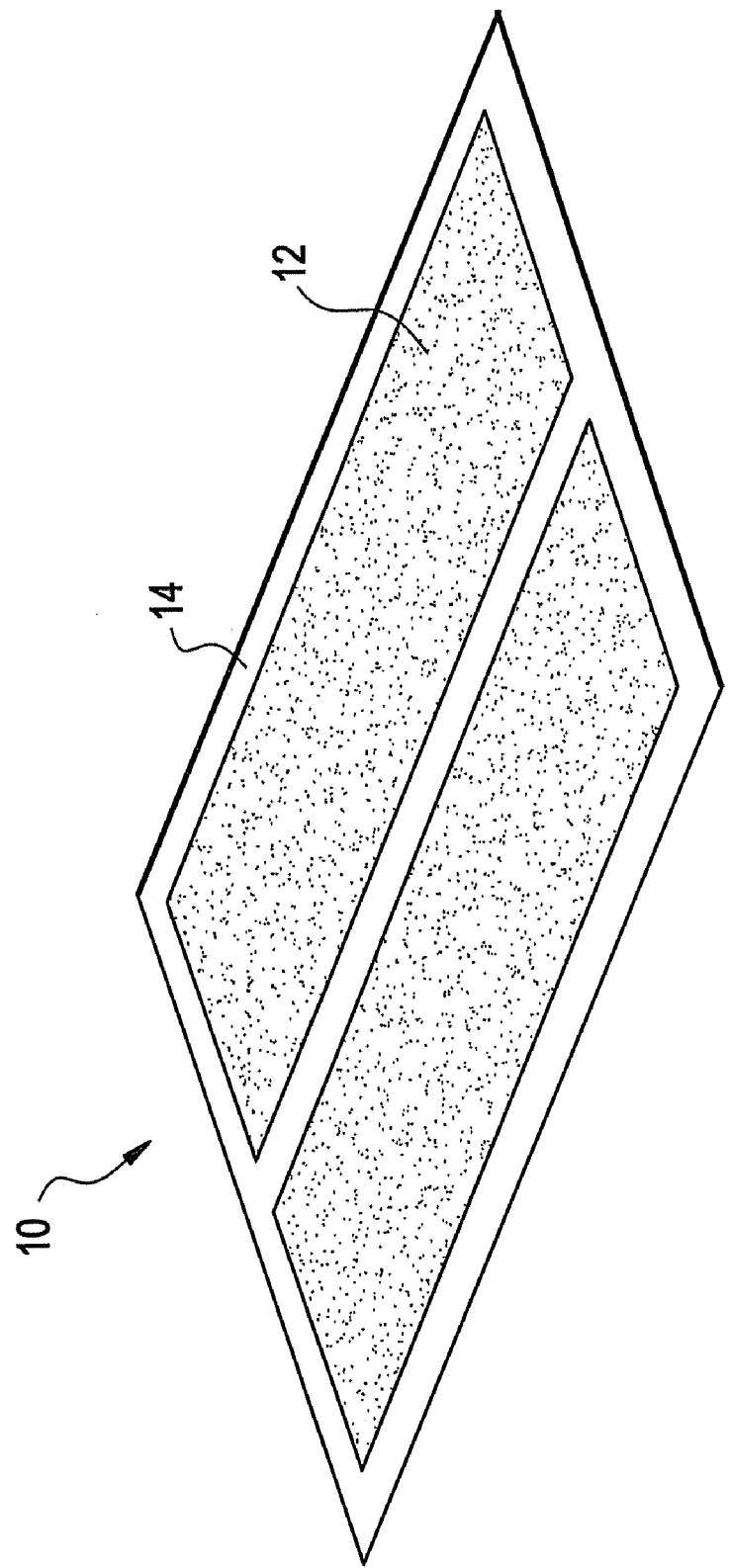
FIG. 1 is a top perspective of a photovoltaic roofing panel.
Figure 2:
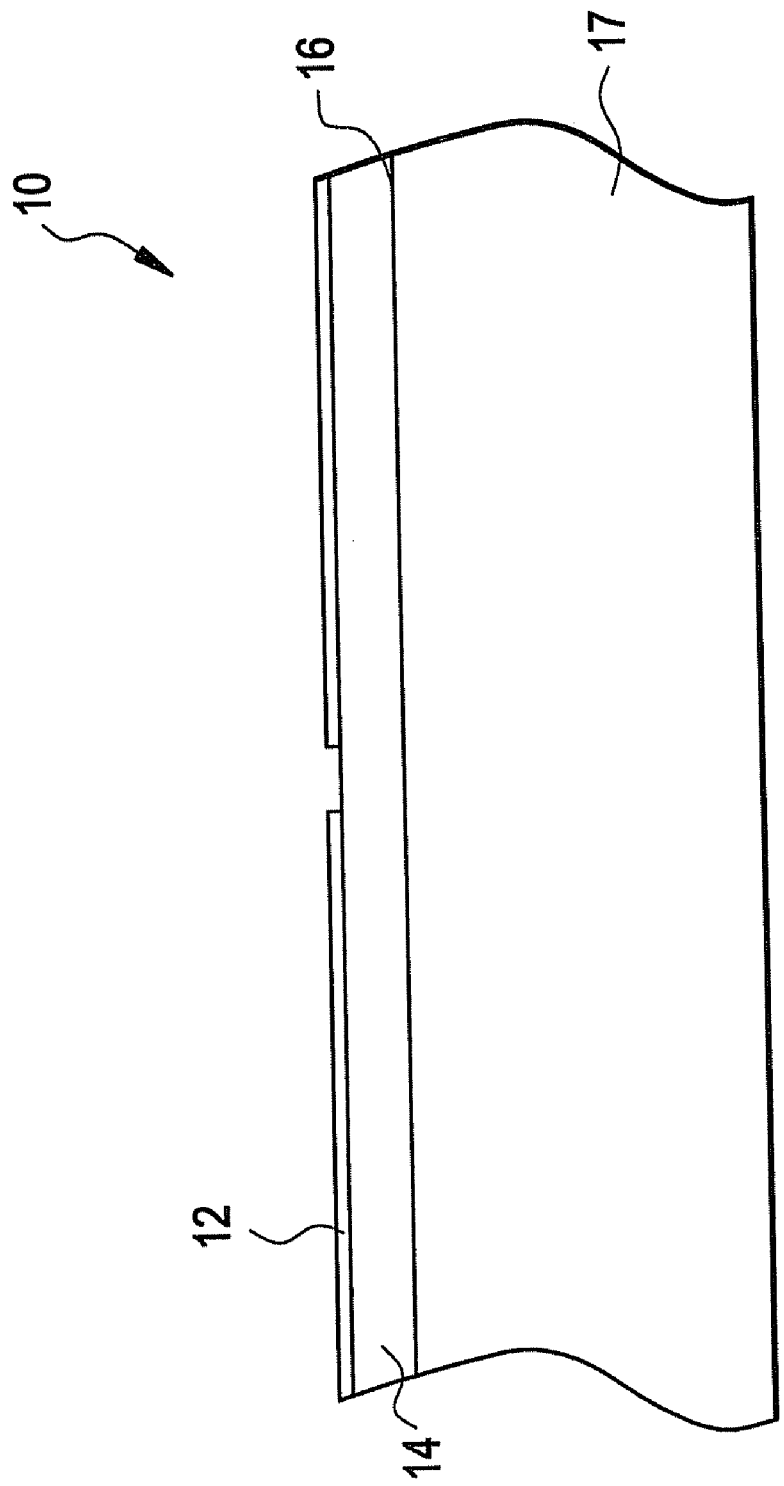
FIG. 2 is a side view of the photovoltaic roofing panel.

Referring to FIGS. 1 and 2, a photovoltaic roofing panel 10 is illustrated. The roofing panel 10 includes at least one photovoltaic collector strip 12 and a substrate 14 configured to be disposed on a roof deck 16 of a structure 17 (i.e., a previously existing roof deck of a building building). The photovoltaic strip 12 is fixedly associated with the substrate 14. The photovoltaic strip 12 is affixed to the substrate 14 via any means desirable, such as adhesive.

Photovoltaic strips such as the strip 14 employ solar power technology that uses solar photovoltaic arrays (within the weather-resistant strips 14) to convert energy from the sun into electricity. Photovoltaic arrays are a linked collection of photovoltaic modules. Each photovoltaic module is made of multiple interconnected solar cells that typically include silicone. The cells convert solar energy into direct current electricity, and work via photovoltaic effect.

Photovoltaic effect employs a photogeneration of charge carriers (electrons) in a light-absorbing material, and separation of the charge carriers to a conductive contact that will transmit the electricity. This effect converts sunlight into electricity. The electricity generated can be significant when photovoltaic solar cells are connected together in photovoltaic modules, arrays, and ultimately strips 14.

Referring back to the exemplary embodiment of FIGS. 1 and 2, the photovoltaic strips 12 are flexible, and fixedly associated with with the substrate 14 in pairs (though certain applications of the photovoltaic roofing panel 10 may require more or less strips 12). In an exemplary embodiment, the substrate 14 is a semi-flexible plastic board (such as polyethylene) of a weight substantial enough to allow the substrate 14 to be loose laid on the roof 16. It should be appreciated however, that other substrate materials, such as air permeable cloth, may also be used as the substrate 14. Use of air permeable cloth would allow for air permeable spaces between the strips 12.

Figure 3:
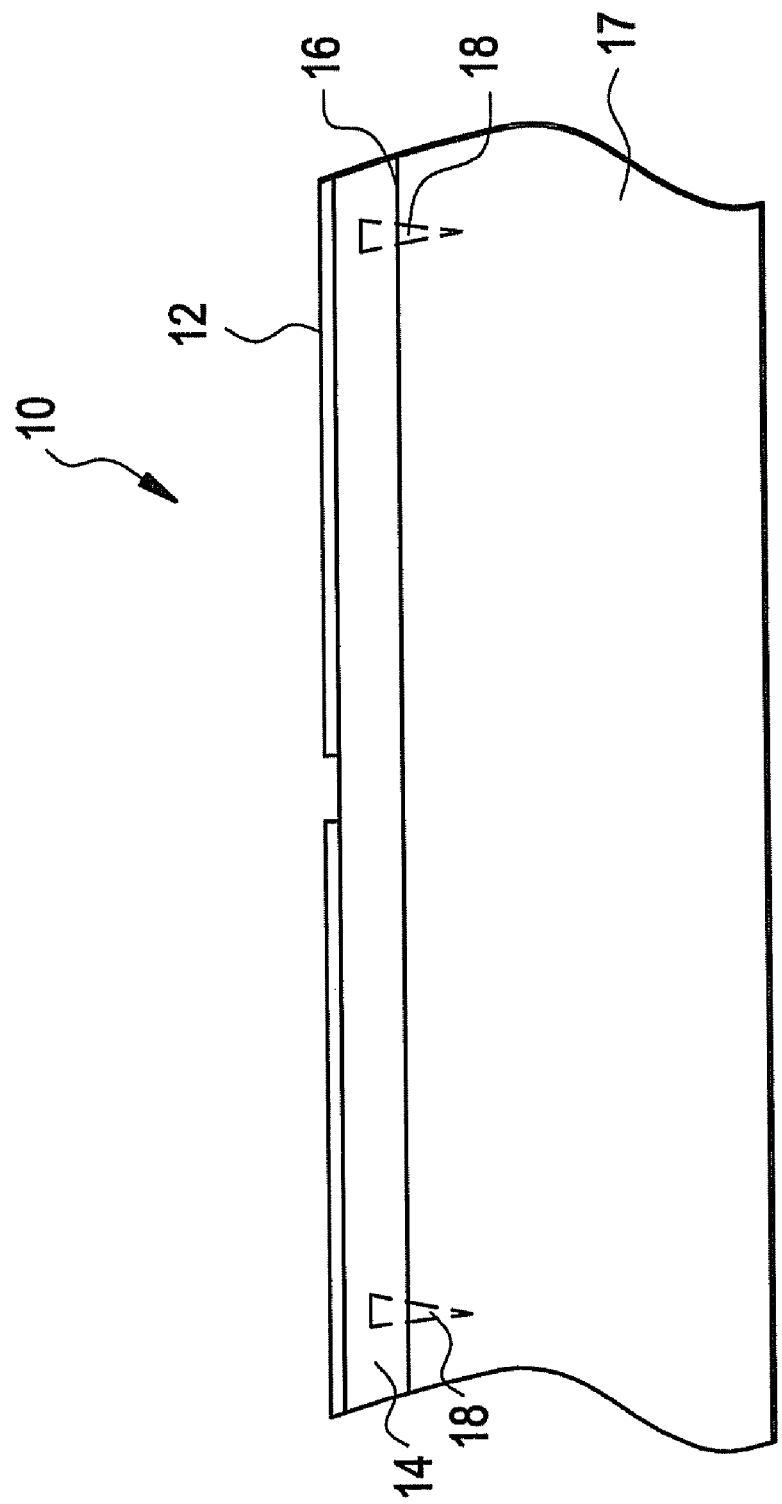
FIG. 3 is a side view of the photovoltaic roofing panel including mechanical fasteners.
Figure 4:
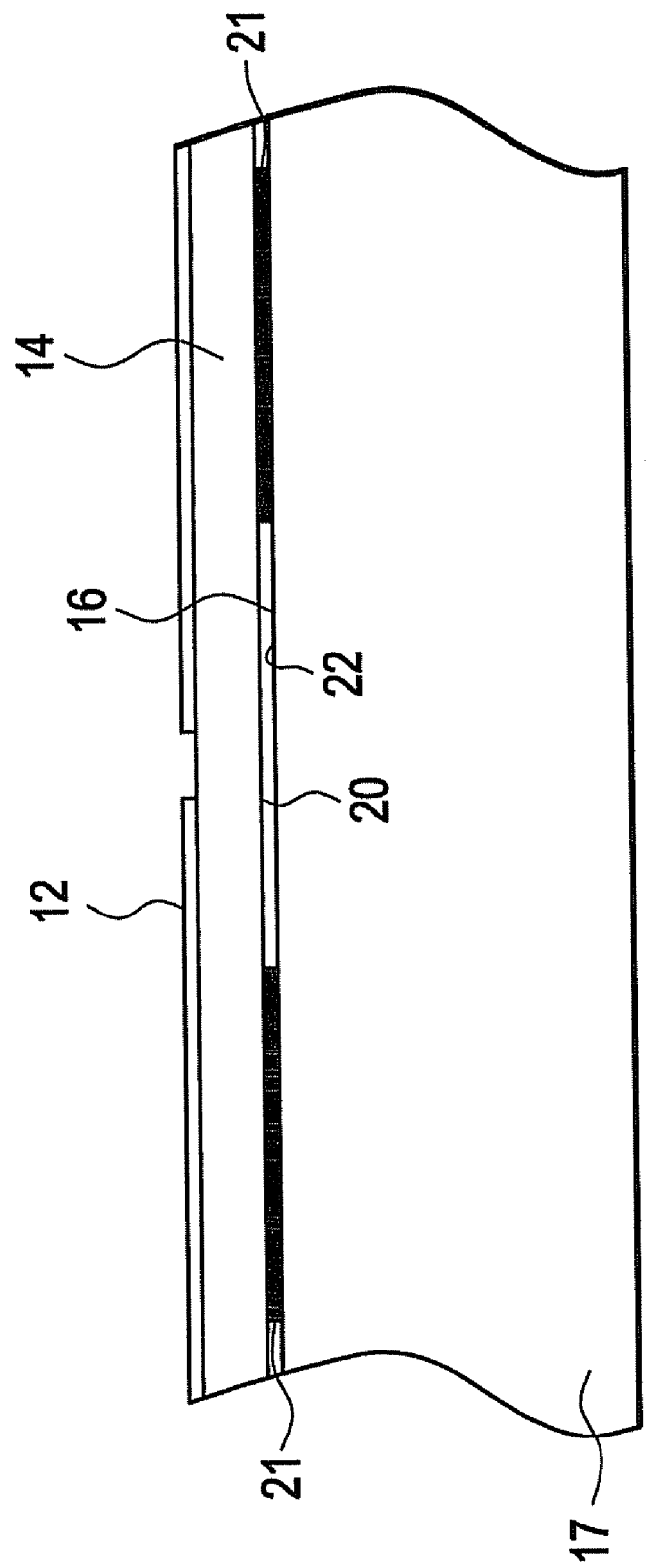
FIG. 4 is a side view of the photovoltaic roofing panel including Velcro.

It should also be appreciated that the roofing panel 10 is associable with the roof 16 via applications other than loose laying. Referring to FIG. 3, the panel 10 is associated with the roof 16 via mechanical fasteners 18 (such as threaded instruments) that run through the substrate 14 and into the roof 16. Referring to FIG. 4, the panel 10 is associated with the roof 16 via compatible Velcro strips 21 affixed to a relative lower surface 20 of the substrate 14, and a relative upper surface 22 of the roof 16.

Figure 5:
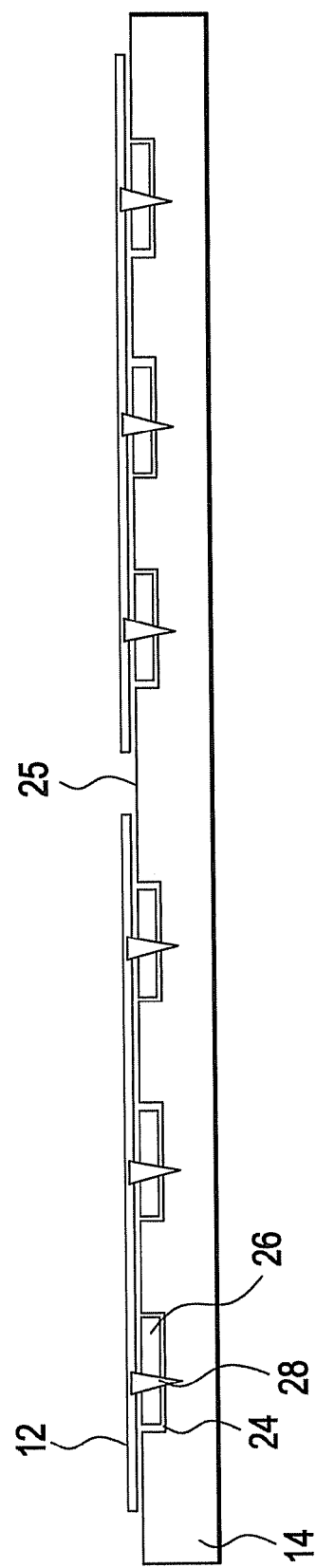
FIG. 5 is a side view of the photovoltaic roofing panel including conductive material.
Figure 6:
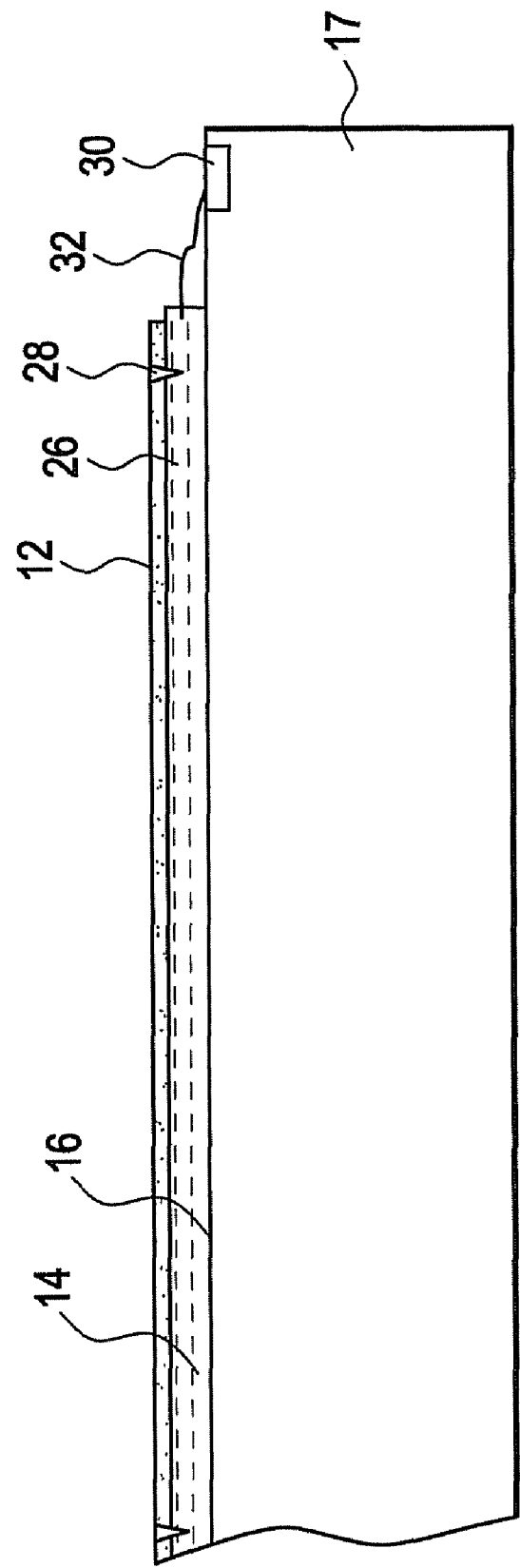
FIG. 6 is a side view of the photovoltaic roofing panel including conductive material disposed within the a substrate of the panel.

Referring to the embodiment of FIGS. 5 and 6, the substrate 14 defines band channels 24. These channels 24 may be open at a relative top surface 25 of the substrate 14, as shown in FIG. 5, or may be enclosed entirely within the substrate 14, as shown in FIG. 6. These channels 24 are configured to hold conductive metal bands 26. The conductive metal bands 26 are electrically associated with the photovoltaic strips 12 via conductive connectors 28 (such as metallic threaded instruments) that run from the strips 12, through the substrate 14 (if the channels 24 are enclosed within the substrate 14 as in FIG. 6), and into electrical association with the bands 26. The bands 26 conduct electricity generated by the strips 12 to a power receiver 30 on the roof 16, wherein the power receiver 30 supplies electricity to a building to which the roof 16 is attached. The bands 26 of adjacent panels 10 may be electrically connected (or of unitary construction with each other) to facilitate conduction of the electricity to the power receiver 30 from the strips 12 that are disposed remotely of the power receiver 30 on the roof 16. Electrical connections 32 from the bands 26 to the power receiver 30 may extend directly from the band 26 to the receiver 30 (as shown in FIG. 6), or from the band 26, through the substrate 12, and into the receiver 30.

Figure 7:
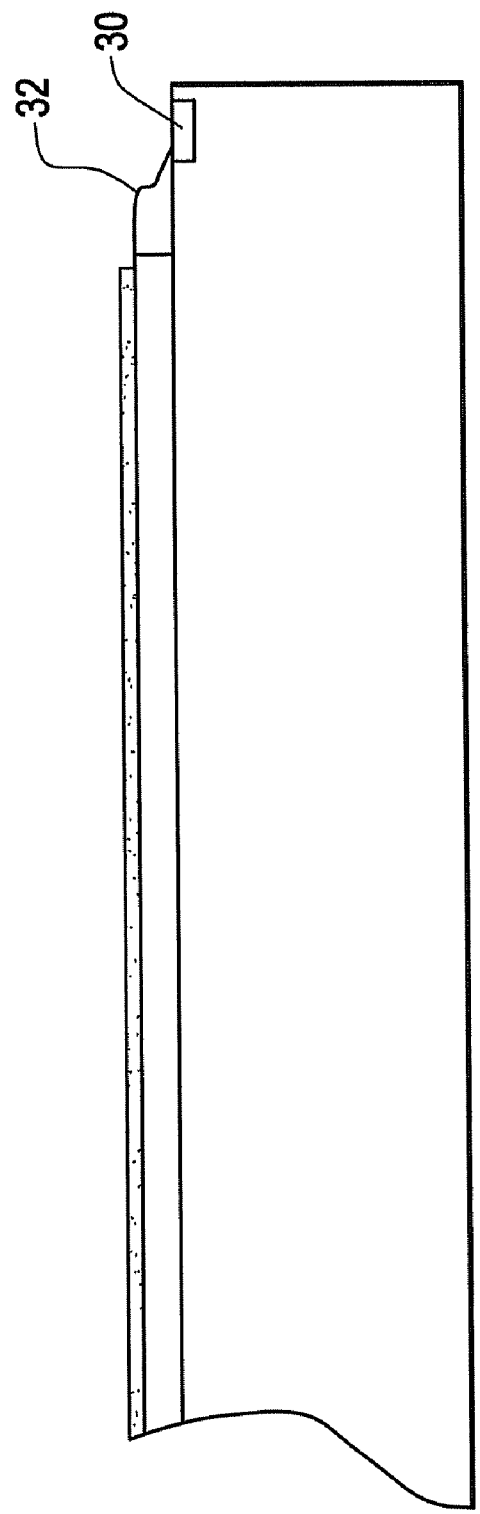
FIG. 7 is a side view of the photovoltaic roofing panel electrically connected form a relative underside of a photovoltaic strip of the panel.
Figure 8:
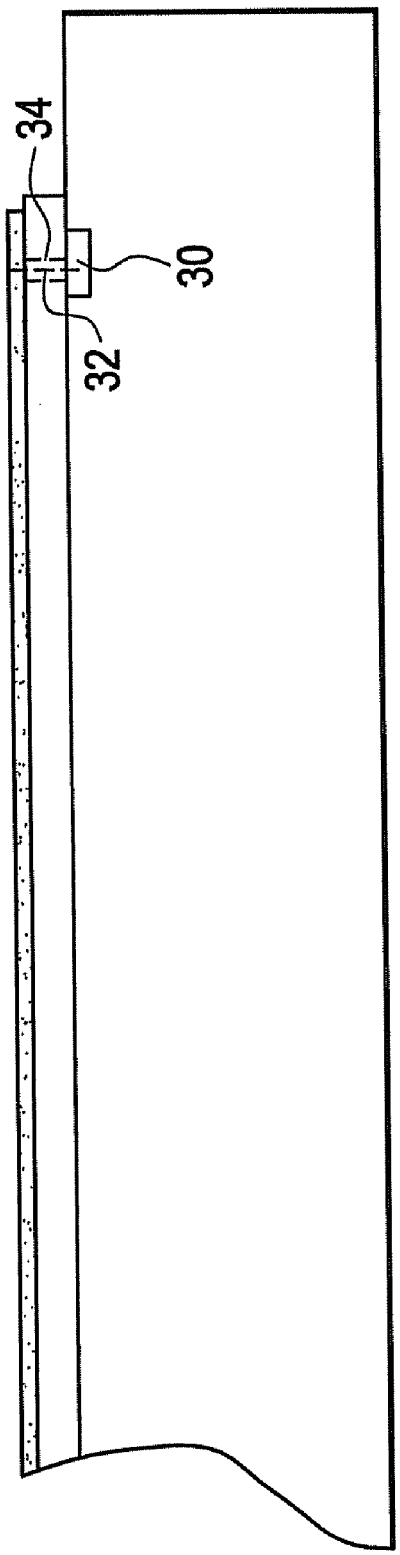
FIG. 8 is a side view of the photovoltaic roofing panel electrically connected form a relative underside of a photovoltaic strip of the panel, through the substrate of the panel.
Figure 9:
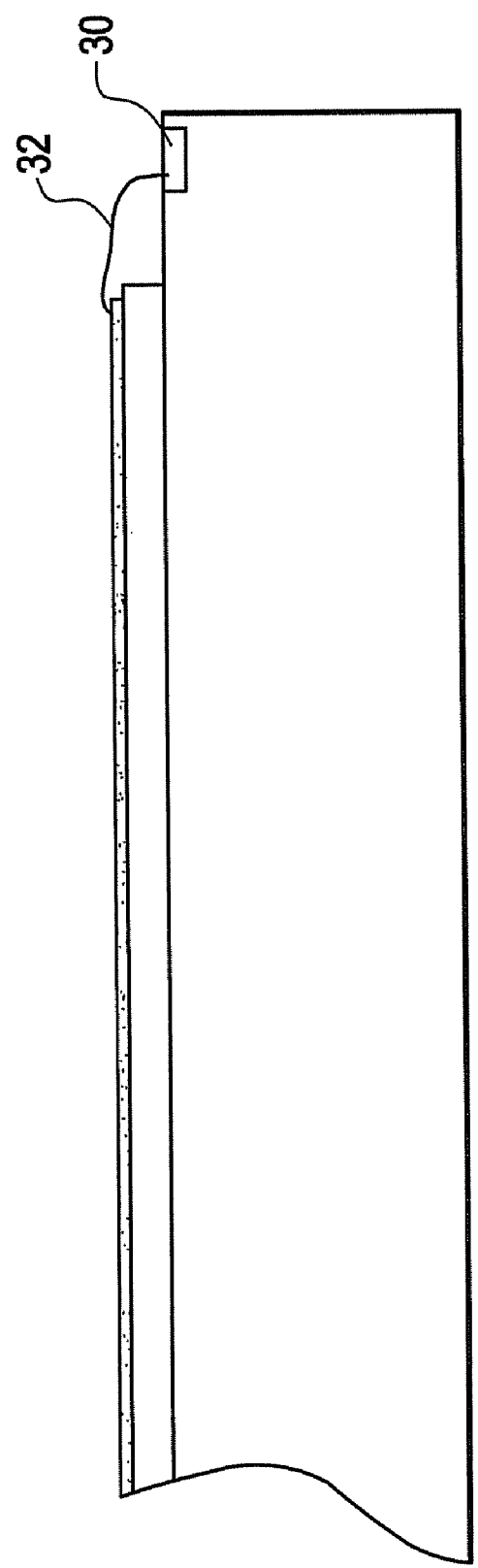
FIG. 9 is a side view of the photovoltaic roofing panel electrically connected form a relative top of a photovoltaic strip of the panel.

As shown in the embodiment of FIGS. 7-9, the photovoltaic strip 12 can also be directly connected to the power receiver 30 (i.e. without using the conductive bands 26 discussed above). The electrical connection 32 may extend from a top, bottom, or edge of the strip 12, and may or may not extend through the substrate 14. If the electrical connection 32 does extend through the substrate 14, it may do so via a connection channel 34 (as shown in FIG. 8).

Figure 10:
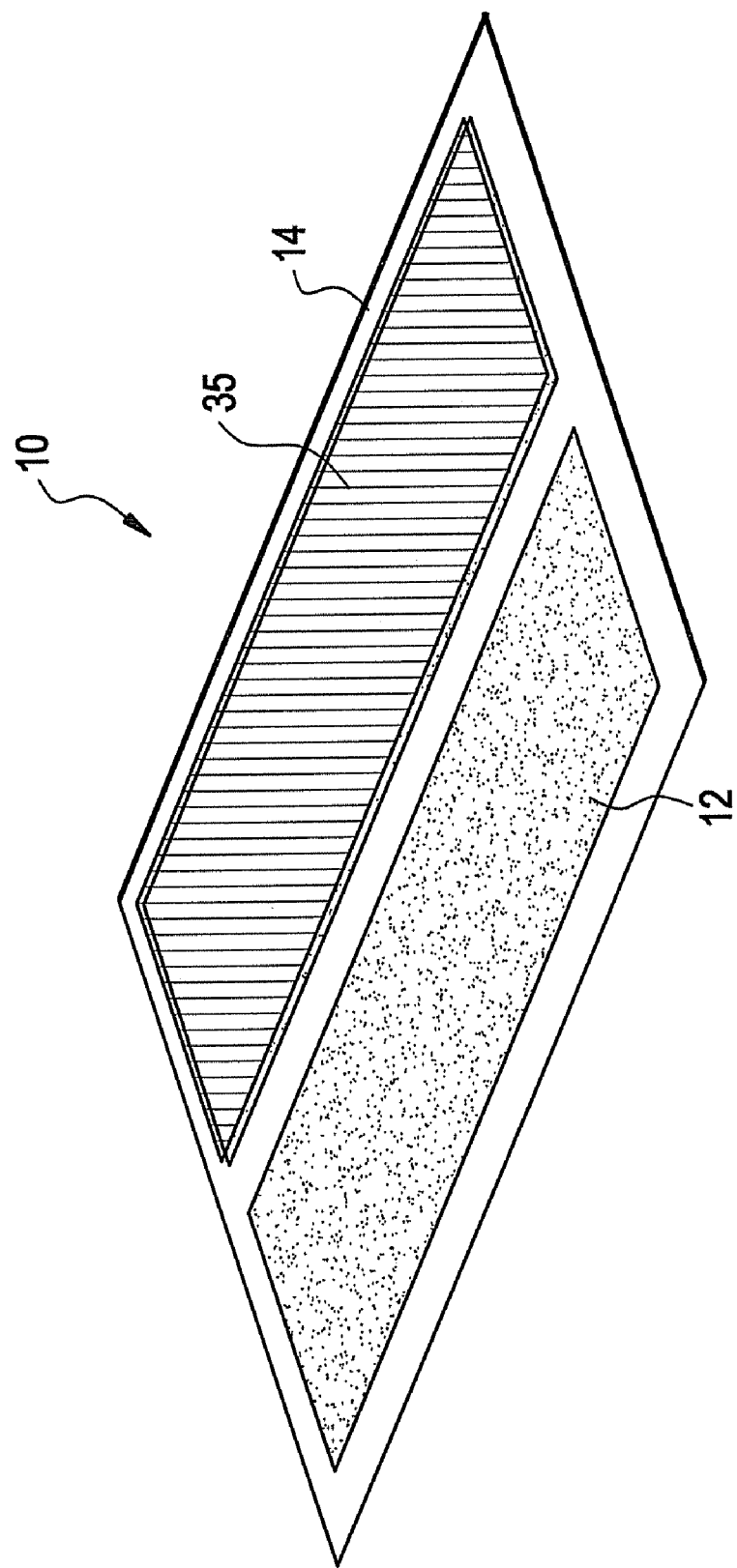
FIG. 10 is a top perspective of a photovoltaic roofing panel including a solar radiation transmutable film.

It should be appreciated that plastic board substrate 14 discussed above may comprise a self-sealing material that allows a threaded instrument to self-seal with the substrate 14 upon installment. Referring to FIG. 10, it should also be appreciated that the panel 10 may include a solar radiation transmutable film 35 disposed upon the photovoltaic strip 14.

Figure 11:
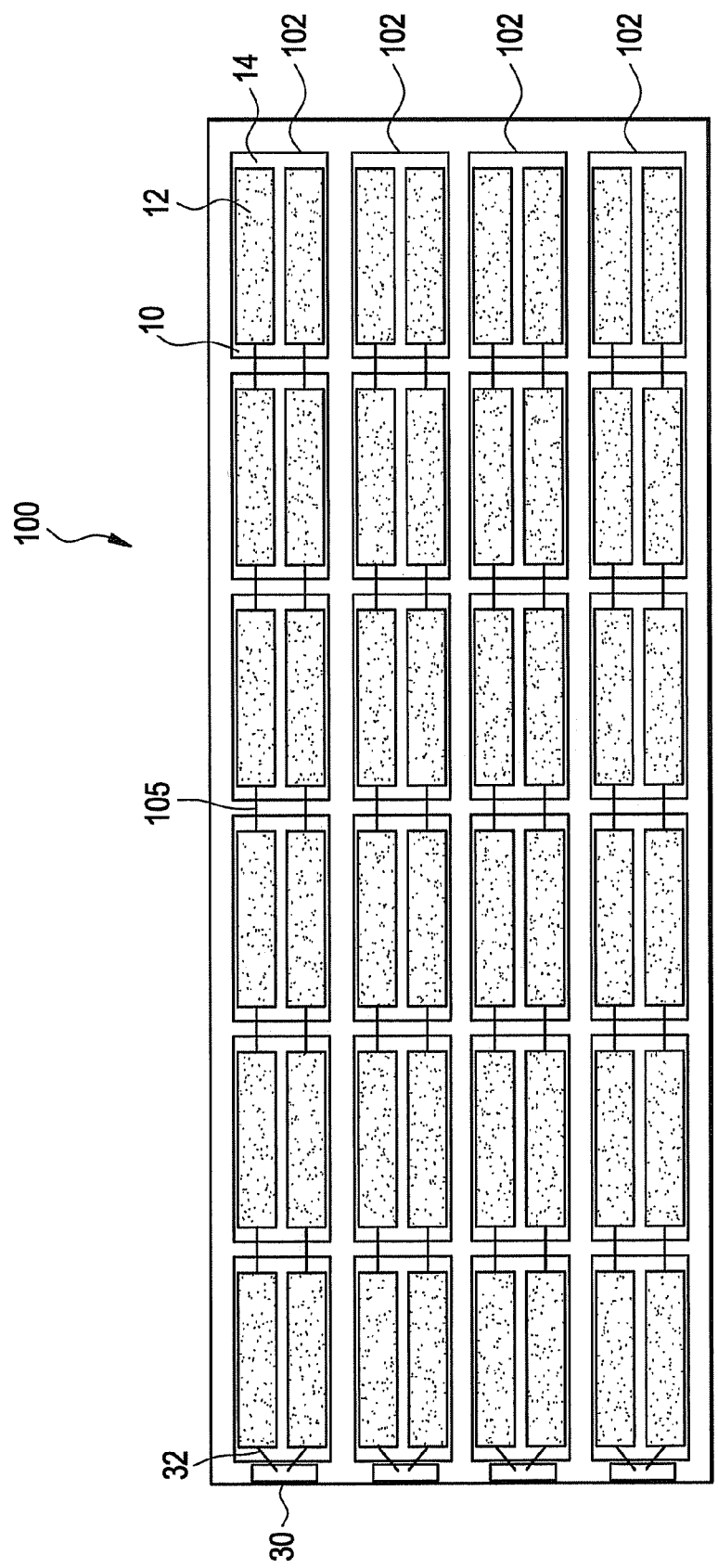
FIG. 11 is a top view of a photovoltaic roofing system.

Referring now to FIG. 11, a photovoltaic roofing system 100 is illustrated. The system 10 includes multiple photovoltaic roofing panels 10, which are contemplated to be inclusive of the elements discussed above (like elements will be numbered as above). As shown in FIG. 11, the multiple panels 10 are arranged in longitudinal rows 102. The panels 10 of each row 102 are connected via electric panel connections 105 that extend between and electrically associate the photovoltaic strips 12 of longitudinally adjacent panels 10. Each of these connections 105 may be detachable from each strip 12 the individual connections 105 associate. The strips 12 of one of the panels 10 electrically associates the row 102 it resides in with one or more power receivers 30 via the electrical connections 32. It should be appreciated that though FIG. 11 illustrates electric associating between the power receivers 30 and the panels 10 on the relative left end of the rows 102, any panel may electrically associate the row 102 it resides in (or the panel 10 individually) with any power receiver 30 disposed anywhere on the roof 16. It should be further appreciated that the conductive bands 26 discussed above may also be used to connect the panels 10 of the rows 102 in the system 100.

Figure 12:
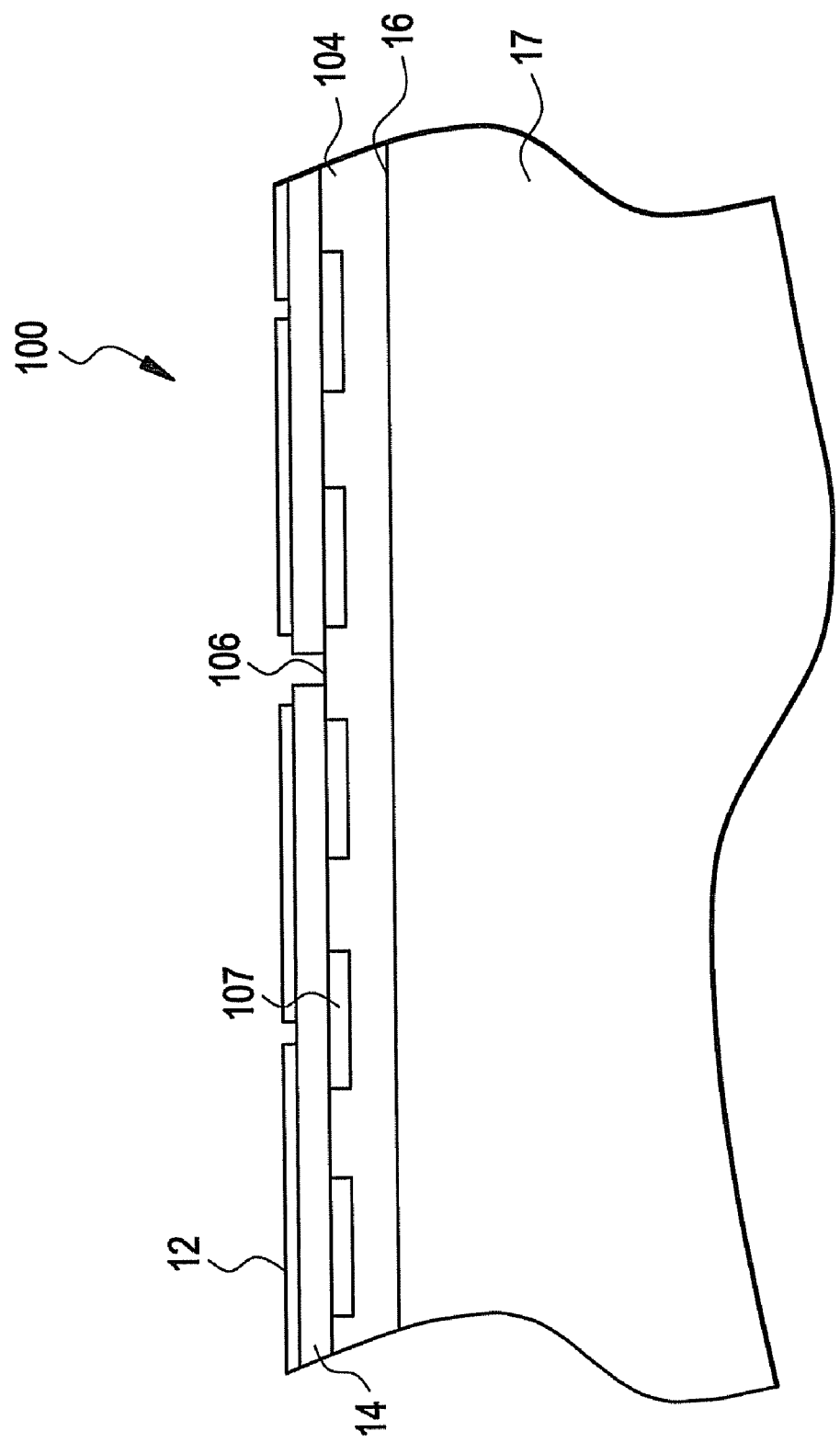
FIG. 12 is a side view of the photovoltaic roofing system including an insulation layer.
Figure 13:
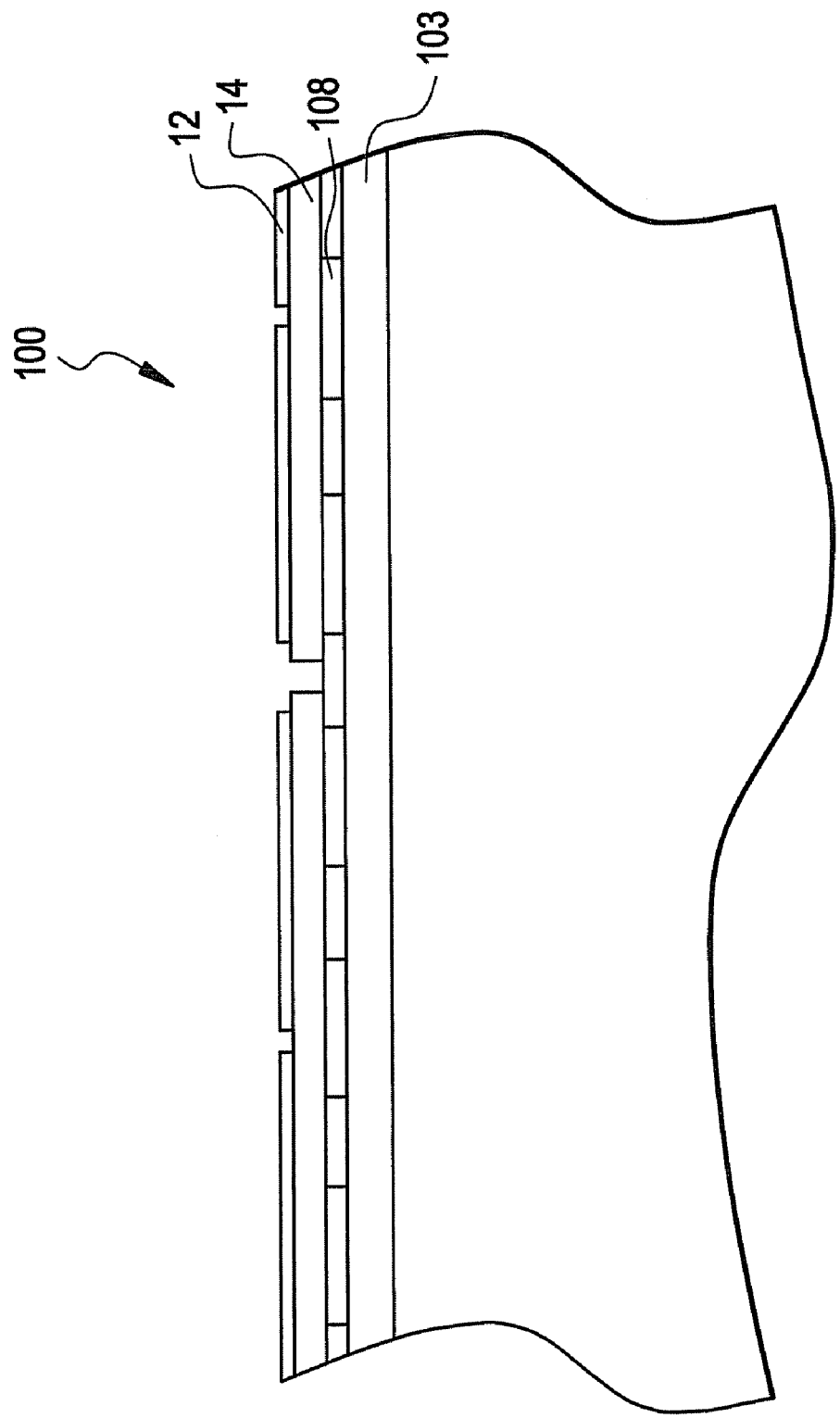
FIG. 13 is a side view of the photovoltaic roofing system including an insulation layer and spacers.
Figure 14:
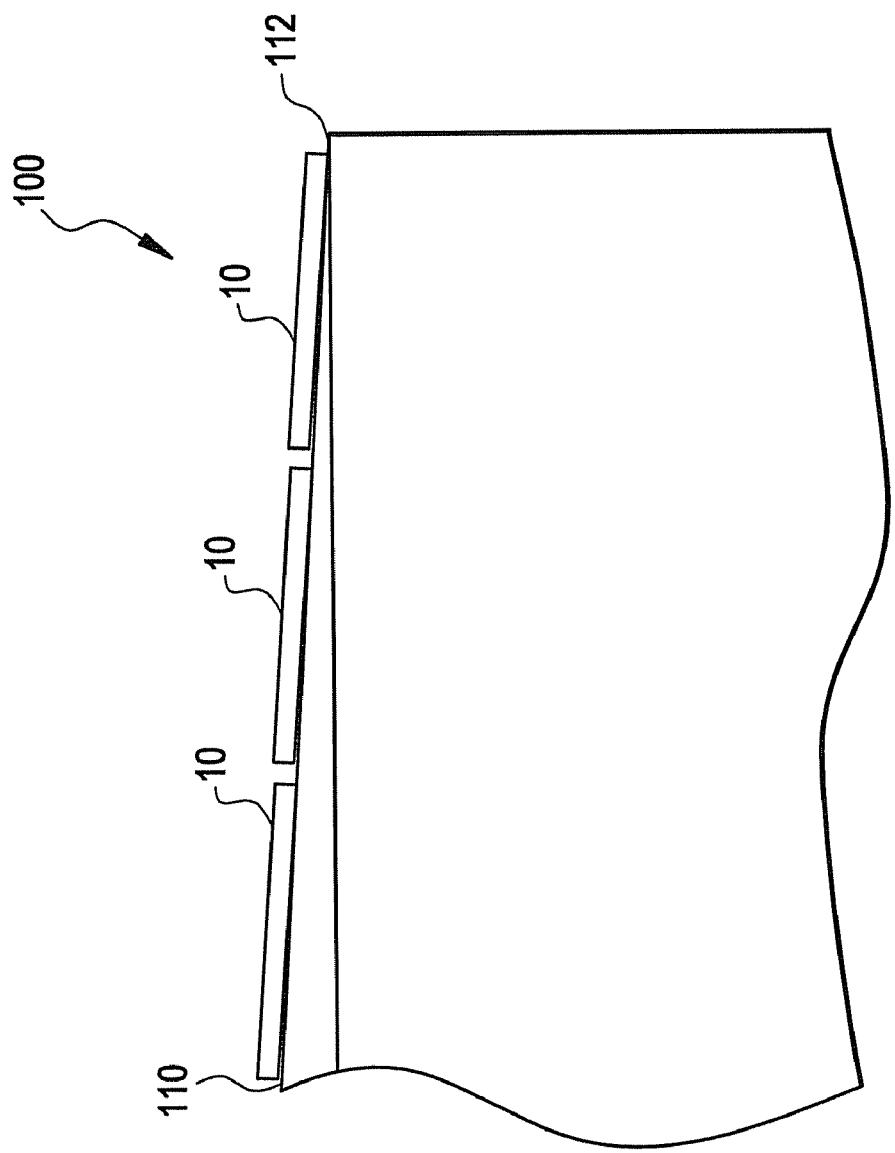
FIG. 14 is a side view of the photovoltaic roofing system including an insulation layer that creates an angles disposal of the panels of the system.

Referring to FIG. 12-14, an insulation layer 104 is disposed between the roof 16 and the substrates 14. As shown in FIG. 12, the insulation layer 103 may define circulation channels 107 in an insulation surface 106 adjacent to the photovoltaic panels 10. These channels facilitate air circulation beneath the panels 10. Alternatively to the channels 104, and as shown in FIG. 13, spacers 108 may be disposed between the insulation layer 103 and the panels 10. These spacers 108 also facilitate air circulation beneath the panels 10.

Referring specifically to FIG. 14, the insulation layer 103 is disposed on the roof deck 16 to include at least one high point 110 that tapers down to at least one low point 112. This tapering creates an angled disposal of the insulation layer 103, which further creates an angled disposal of the panels 10 disposed upon the insulation layer 103. This angled disposal of the panels 10 may allow for enhanced solar exposure and collection.

Figure 15:
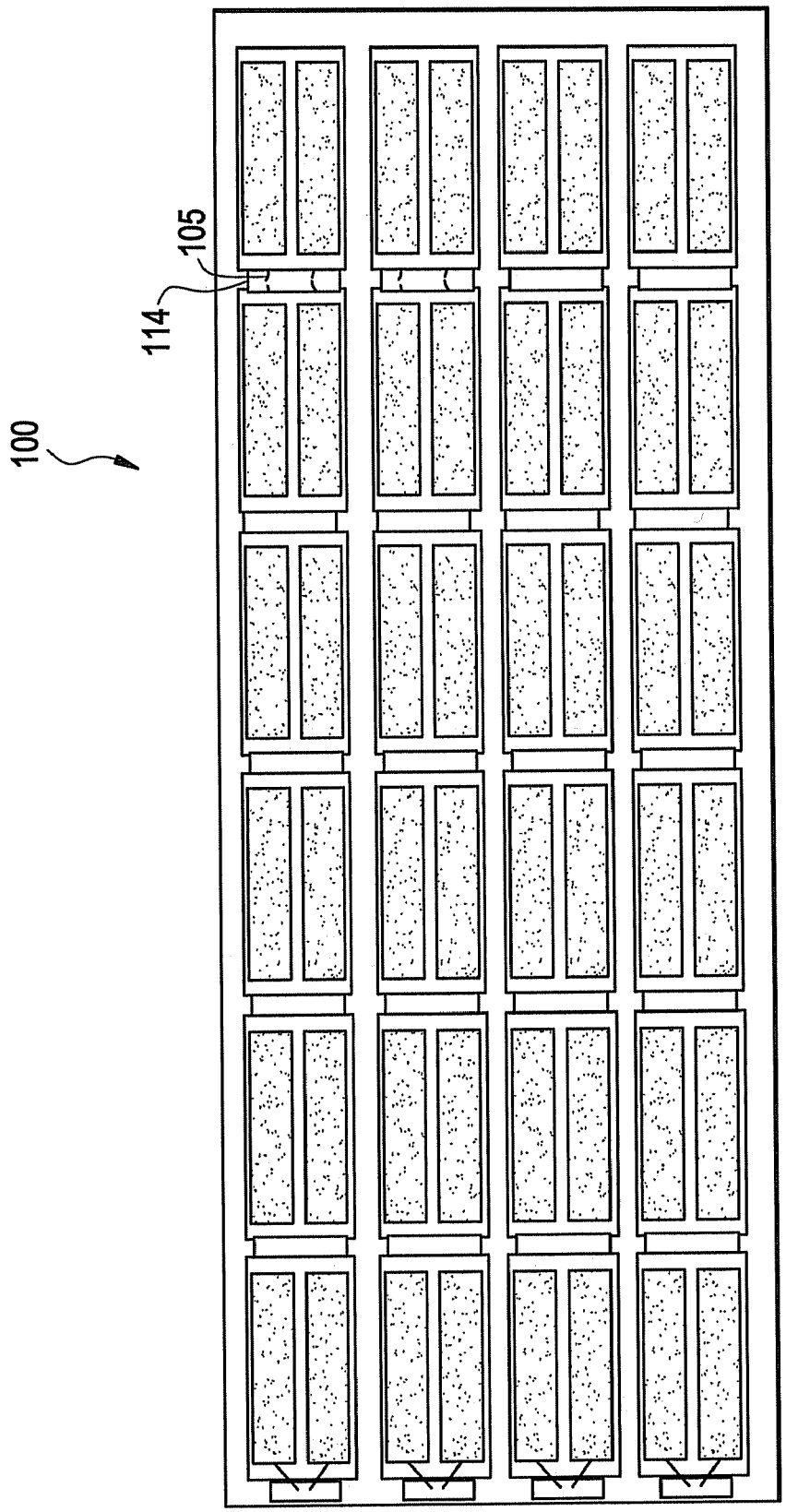
FIG. 15 is a top view of the photovoltaic roofing system including panels that are associated via flexible sheets.
Figure 16:
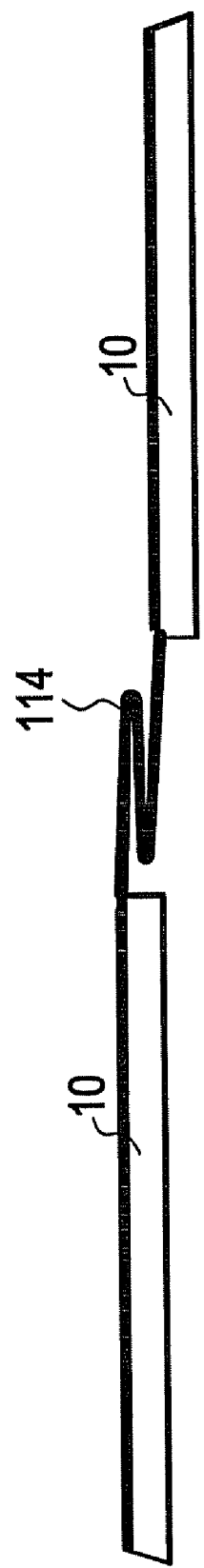
FIG. 16 is a side view of two panels of FIG. 15, the panels being away from disposal on a roof.

Referring to FIGS. 15 and 16, in addition to being electrically connected (or connectable), the panels 10 in the rows 102 may also be connected via flexible sheets 114. These sheets 114 may be folded back upon themselves as shown in FIG. 16, so as to allow convenient transportation of the rows 102 prior to installation upon the roof 16. The sheets 114 may house the electric panel connections 105, providing the connections 105 with some protection from weather.

Figure 17:
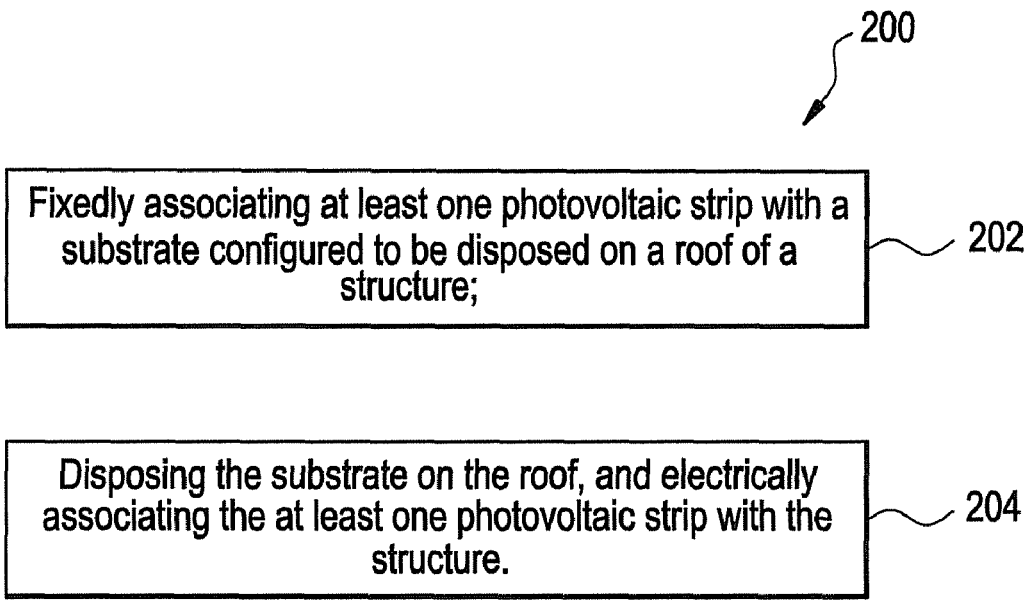
FIG. 17 is a block diagram illustrating a method for providing photovoltaic power.

FIG. 17 illustrates a method 200 for providing photovoltaic power. The method includes fixedly associating at least one photovoltaic strip 12 with a substrate 14 configured to be disposed on a roof 16 of a structure 17, as shown in operational block 202. The method 200 also includes disposing the substrate 14 on the roof 16, and electrically associating the at least one photovoltaic strip 12 with the structure 17, as shown in operational block 204.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A photovoltaic roofing panel comprising:
at least one photovoltaic collector strip; and
a semi-flexible board configured to be disposed on a roof deck, said at least one photovoltaic collector strip being fixedly associated with said semi-flexible board;
at least one channel defined by said semi-flexible board and enclosed at a relatively upper portion by said at least one photovoltaic collector strip; and
conductive material configured to carry electricity generated by said at least one photovoltaic collector strip and disposed entirely beneath said at least one photovoltaic collector strip via disposal within said at least one channel enclosed at said upper surface by said at least one photovoltaic collector strip, said conductive material being electrically associated with said at least one photovoltaic collector strip via conductive connectors disposed to run vertically from said at least one photovoltaic collector strip forming said upper portion of said at least one channel, entirely through said conductive material and said at least one channel, and into said semi-flexible board defining said at least one channel.

2. The panel of claim 1, wherein said semi-flexible board is a semi-flexible plastic board of a weight substantial enough allow said board to be loose laid on said roof deck.

3. The panel of claim 1, wherein said semi-flexible board is a semi-flexible plastic board configured to be fixedly associated to said roof deck via at least one of mechanical fastening.

4. The panel of claim 1, wherein said semi-flexible board is a semi-flexible plastic board configured to be fixedly associated to said roof deck via commercial hook and loop fasteners attached to said roof deck.

5. The panel of claim 1, wherein said semi-flexible board is a semi-flexible plastic board comprising a material that allows at least one threaded instrument to self-seal when penetrating into said board.

6. The panel of claim 1, wherein said at least one photovoltaic collector strip is configured for an electrical connection with a building of said roof deck from an underside of said at least one photovoltaic collector strip.

7. The panel of claim 1, wherein said at least one photovoltaic collector strip is configured for electrical connection with a building of said roof deck from a relative top surface of said at least one photovoltaic collector strip.

8. The panel of claim 1, wherein a solar radiation transmutable film is disposed upon said at least one photovoltaic strip.

9. A photovoltaic roofing system comprising:
a roof deck;
at least one photovoltaic panel disposed with said roof deck, said at least one panel comprising at least one photovoltaic collector strip and a semi-flexible board configured to be disposed with said roof deck, said at least one photovoltaic collector strip being fixedly associated with said substrate,
at least one channel defined by said semi-flexible board and enclosed at a relatively upper portion by said at least one photovoltaic collector strip; and
conductive material configured to carry electricity generated by said at least one photovoltaic collector strip and disposed entirely beneath said at least one photovoltaic collector strip via disposal within said at least one channel enclosed at said upper surface by said at least one photovoltaic collector strip, said conductive material being electrically associated with said at least one photovoltaic collector strip via conductive connectors disposed to run vertically from said at least one photovoltaic collector strip forming said upper portion of said at least one channel, entirely through said conductive material and said at least one channel, and into said semi-flexible board defining said at least one channel.

10. The system of claim 9, wherein said at least one photovoltaic panel is disposed upwardly adjacent to said roof deck.

11. The system of claim 9, wherein insulation is disposed upwardly adjacent to said roof deck, and said at least one photovoltaic panel is disposed upwardly adjacent to said insulation.

12. The system of claim 11, wherein said insulation is disposed on said roof deck to include at least one high point that tapers down to at least one low point to create an angled disposal of said at least one photovoltaic panels.

13. The system of claim 11, wherein said insulation defines circulation channels in an insulation surface adjacent to said at least one photovoltaic panel.

14. The system of claim 13, wherein at least one spacer is disposed between said insulation and said at least photovoltaic panel.

15. A photovoltaic panel arrangement comprising:
a plurality of photovoltaic panels, each of said plurality of panels comprising at least one photovoltaic collector strip and a semi-flexible board configured to be disposed on a roof deck, said at least one photovoltaic collector strip being fixedly associated with said substrate,
at least one channel defined by said semi-flexible board and enclosed at a relatively upper portion by said at least one photovoltaic collector strip; and
conductive material configured to carry electricity generated by said at least one photovoltaic collector strip and disposed entirely beneath said at least one photovoltaic collector strip via disposal within said at least one channel enclosed at said upper surface by said at least one photovoltaic collector strip, said conductive material being electrically associated with said at least one photovoltaic collector strip via conductive connectors disposed to run vertically from said at least one photovoltaic collector strip forming said upper portion of said at least one channel, entirely through said conductive material and said at least one channel, and into said semi-flexible board defining said at least one channel; and
a means of associating said plurality of photovoltaic panels.

16. The arrangement of claim 15, wherein said means is a flexible sheet affixed to said plurality of panels to extend between each of said panels and a panel adjacent to each in at least one direction.

17. The arrangement of claim 16, wherein said flexible sheet is foldable upon itself.

18. The arrangement of claim 15, wherein said plurality of panels are electrically associated with each other.

19. A method for providing photovoltaic power, the method comprising:
fixedly associating at least one photovoltaic strip with a semi-flexible board configured to be disposed on a roof of a structure, conductive material configured to carry electricity generated by said at least one photovoltaic collector strip and disposed entirely beneath said at least one photovoltaic collector strip via disposal within said at least one channel enclosed at said upper surface by said at least one photovoltaic collector strip, said conductive material being electrically associated with said at least one photovoltaic collector strip via conductive connectors disposed to run vertically from said at least one photovoltaic collector strip forming said upper portion of said at least one channel, entirely through said conductive material and said at least one channel, and into said semi-flexible board defining said at least one channel;
disposing said semi-flexible board on said roof; and
electrically associating said at least one photovoltaic strip with said structure.

* * * * *